Aug. 16, 1932. J. HARTMANN 1,872,582
WINDSHIELD
Filed April 16, 1931
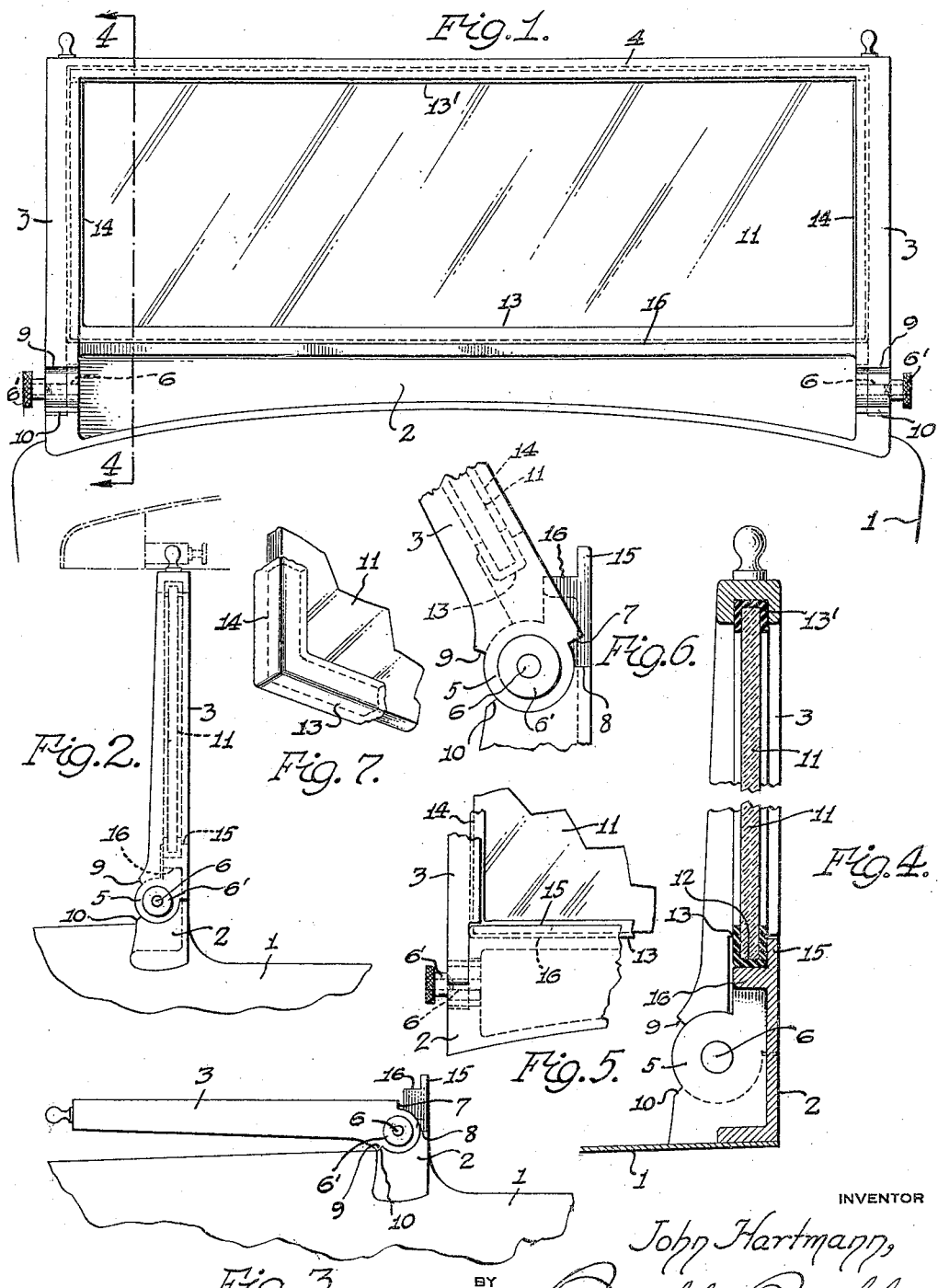
INVENTOR
John Hartmann,
BY
ATTORNEYS Patented Aug. 16, 1932

1,872,582

UNITED STATES PATENT OFFICE

JOHN HARTMANN, OF DETROIT, MICHIGAN, ASSIGNOR TO AMERICAN ART METAL WORKS, INC., OF DETROIT, MICHIGAN, A CORPORATION OF MICHIGAN

WINDSHIELD

Application filed April 16, 1931. Serial No. 530,588.

The present invention pertains to a novel windshield designed particularly for motor vehicles and of a type adapted to be swung down to a horizontal position when not in use. A windshield of this class comprises essentially a base mounted on the cowl and a frame pivoted to the base, the frame carrying the glass. In the interest of economy and neat appearance, it is preferred to build the frame as a three-sided member, and in consequence of which the lower edge of the glass mounted therein is free. A water and air sealing means must be provided between the free edge and the base when the windshield is adjusted to upright or service position. Hitherto, this sealing means has consisted of a strip carried by the lower or free edge of the glass and adapted to engage the base. Such a strip has been found to shrink, leaving spaces at the ends of the free edge of the glass, and such spaces constitute water leaks.

The principal object of the present invention is to overcome this objection and is accomplished by the use of an integral U-shaped strip engaging the free edge and also the adjacent edges of the glass. This strip is preferably of channel cross section, and the parts thereof extending from the free edge of the glass are fitted tightly into the sides of the frame. Thus, the free edge portion of the strip is held against shrinkage and the formation of leaks is avoided.

The invention provides further for a firm seating of the free edge portion of the strip. Accordingly, the base is formed with a seat of longitudinal cross section and the pivotal axis of the frame is offset downwardly and preferably laterally from the seat. The free edge portion of the strip, in approaching the seat, follows an arc which has a downward and a horizontal component, whereby two surfaces of the sealing strip are brought with pressure against the two sides of the angular seat.

The invention is fully disclosed by way of example in the following description and in the accompanying drawing, in which—

Figure 1 is a front elevation of the device;

Fig. 2 is an end view thereof;

Fig. 3 is a similar view, showing the windshield lowered to horizontal position;

Fig. 4 is a section on the line 4—4 of Figure 1;

Fig. 5 is a detail rear elevation at one of the lower corners of the windshield;

Fig. 6 is a detail end view showing the windshield partly lowered, and

Fig. 7 is a detail perspective view of one of the lower corners of the glass, showing the manner in which the sealing strip is applied.

Reference to these views will now be made by use of like characters which are employed to designate corresponding parts throughout.

In Figure 1, the numeral 1 designates a conventional automobile cowl on which is mounted a windshield base member 2 transversely of the vehicle. Upon the base is mounted a three-sided frame consisting of vertical sides 3 and a connecting top piece 4. The lower side of the frame is open as may be seen more clearly in Figures 4 and 5. The lower ends of the side members 3 are formed with knuckles 5 or similar means whereby the frame may be pivotally attached to the base through the medium of pivot pins or studs 6 which determine the pivotal axis.

The lower ends of the side members are formed inwardly with shoulders or stops 7 which lie horizontally when the frame is upright and in this position rest upon seats 8 in the base 1, whereby the frame may thereby be supported in an upright position. In like manner, the lower end of each of the sides 3 is formed with a forward angular stop 9 adapted to engage a complementary seat 10 in the base 1 when the frame is swung forwardly over the cowl as shown in Figure 3. The surfaces 9 and 10 are so related that they maintain the frame in a substantially horizontal position when they are in contact. Any suitable locking or tightening means, such as nuts 6' threaded on the studs 6, may be provided for maintaining the upright or horizontal position of the frame.

In the frame is mounted a pane of glass 11 received in the side members 3 and top piece 4 and necessarily having its lower edge free of the frame. On this lower edge is fitted a sealing strip 13 preferably of rubber having a channel cross section. This member is also preferably extended as at 14 along the adjacent edges of the glass, and in such case is a continuous piece as shown in Figure 7. This member which is of U-shape in elevation may be molded as a unitary structure. The end portions 13 are fitted tightly in the side members 3 of the frame. The upper edge of the glass is fitted with a sealing strip 13' of rubber or fabric which may be integral with the members 14 if desired.

The base 2 is formed with a seat along the top thereof and preferably of angular cross section presenting a vertical side 15 and a horizontal side 16. The seat is so positioned as to receive the longitudinal or free edge portion 13 of the sealing strip when the frame is upright as shown in Figure 4. The pivotal axis of the hinge connections 5, 6 is preferably offset from the seat, downwardly and forwardly, so that the free or longitudinal channel section 13 swings in an arc. In moving towards the upright position, the channel portion 13 therefore has a downward component and a lateral component, whereby it seats under pressure against the sides 15 and 16.

As a result of this arrangement, there is obviously provided a tight water and air seal at the seat 15, 16. Moreover, the integral nature of the sealing strip 13, 14 insures a permanent sealing effect at the lower corners of the glass 11. In other words, the lower corners are free from leakage which occurs as a result of shrinkage when a straight-line strip is applied merely to the lower edge of the glass.

Although a specific embodiment of the invention has been illustrated and described it will be understood that various alterations in the details of construction may be made without departing from the scope of the invention, as indicated by the appended claims.

What I claim is:—

1. A windshield comprising a base, a frame pivotally attached to said base and adapted to swing from an upright to a horizontal position, a pane of glass mounted in said frame and having a free lower edge alongside said base, said base being formed with a seat of angular cross section parallel to said edge and adapted to receive the same, and a sealing strip of channel cross section carried by said free edge and adapted to fit into said seat when the frame is upright.

2. A windshield comprising a base, a frame pivotally attached to said base and adapted to swing from an upright to a horizontal position, a pane of glass mounted in said frame and having a free lower edge alongside said base, said base being formed with a seat of angular cross section parallel to said edge and adapted to receive the same, and a sealing strip of channel cross section carried by said free edge and adapted to fit into said seat when the frame is upright, the pivotal axis of said frame being disposed below said seat.

3. A windshield comprising a base, a frame pivotally attached to said base and adapted to swing from an upright to a horizontal position, a pane of glass mounted in said frame and having a free lower edge alongside said base, said base being formed with a seat of angular cross section parallel to said edge and adapted to receive the same, and a sealing strip of channel cross section carried by said free edge and adapted to fit into said seat when the frame is upright, the pivotal axis of said frame being offset downwardly and transversely of said seat.

4. A windshield comprising a base, a frame pivotally attached to said base and adapted to swing from an upright to a horizontal position, a pane of glass mounted in said frame and having a free lower edge alongside said base, said base being formed with a seat of angular cross section parallel to said edge and adapted to receive the same, and a continuous sealing strip of channel cross section fitted on said free edge and the two adjacent edges of said pane, the free edge portion of said strip being adapted to engage two sides of said seat when said frame is upright, and the adjacent edges of said strip being fitted in the sides of said frame.

5. A windshield comprising a base, a frame pivotally attached to said base and adapted to swing from an upright to a horizontal position, a pane of glass mounted in said frame and having a free lower edge alongside said base, said base being formed with a seat of angular cross section parallel to said edge and adapted to receive the same, and a continuous sealing strip of channel cross section fitted on said free edge and the two adjacent edges of said pane, the free edge portion of said strip being adapted to engage two sides of said seat when said frame is upright, and the adjacent edges of said strip being fitted in the sides of said frame, the pivotal axis of said frame being disposed below said seat.

6. A windshield comprising a base, a frame pivotally attached to said base and adapted to swing from an upright to a horizontal position, a pane of glass mounted in said frame and having a free lower edge alongside said base, said base being formed with a seat of angular cross section parallel to said edge and adapted to receive the same, a continuous sealing strip of channel cross section fitted on said free edge and the two adjacent edges of said pane, the free edge portion of said strip being adapted to engage two sides of said seat when said frame is upright, and the adjacent edges of said strip being fitted in the sides of said frame, the pivotal axis of said frame being offset downwardly and transversely of said seat.

In testimony whereof I affix my signature.

JOHN HARTMANN.